US009823987B1

(12) United States Patent
Son et al.

(10) Patent No.: US 9,823,987 B1
(45) Date of Patent: Nov. 21, 2017

(54) DATA QUALITY PRE-SELECTION IN READ RETRY OPERATIONS

(71) Applicant: Seagate Technology LLC, Cupertino, CA (US)

(72) Inventors: Mingyeong Son, Seoul (KR); Seungyoul Jeong, Gyeonggi-do (KR); Seokhun Jeon, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 182 days.

(21) Appl. No.: 14/873,740

(22) Filed: Oct. 2, 2015

(51) Int. Cl.
*G06F 11/00* (2006.01)
*G06F 11/20* (2006.01)

(52) U.S. Cl.
CPC ...... *G06F 11/2094* (2013.01); *G06F 2201/85* (2013.01)

(58) Field of Classification Search
CPC ........... G06F 11/2094; G11B 20/10037; G11B 20/10046; G11B 20/10055; G11B 20/10009; G11B 20/18; G11B 20/1879
See application file for complete search history.

(56) References Cited

U.S. PATENT DOCUMENTS

| 5,938,789 | A | * | 8/1999 | Itoi | ................. | G11B 20/10009 |
| | | | | | | 360/39 |
| 6,009,549 | A | * | 12/1999 | Bliss | ................ | G11B 20/10009 |
| | | | | | | 360/51 |
| 6,862,151 | B2 | | 3/2005 | Hoskins et al. | | |
| 6,993,688 | B2 | | 1/2006 | Su et al. | | |
| 7,136,244 | B1 | | 11/2006 | Rothberg | | |
| 7,206,990 | B2 | | 4/2007 | Su et al. | | |
| 7,900,125 | B1 | | 3/2011 | Liu et al. | | |
| 8,161,361 | B1 | * | 4/2012 | Song | ................ | G11B 20/10527 |
| | | | | | | 360/67 |
| 2001/0010605 | A1 | | 8/2001 | Aoki | | |
| 2003/0202268 | A1 | * | 10/2003 | Wang | .................. | G11B 5/5547 |
| | | | | | | 360/31 |
| 2009/0251817 | A1 | * | 10/2009 | Tang | ........................ | G11B 5/09 |
| | | | | | | 360/53 |
| 2015/0378801 | A1 | * | 12/2015 | Navon | .................. | G06F 11/076 |
| | | | | | | 714/704 |
| 2016/0041891 | A1 | * | 2/2016 | Malshe | ............... | G06F 11/2094 |
| | | | | | | 714/704 |

* cited by examiner

*Primary Examiner* — Michael Maskulinski
(74) *Attorney, Agent, or Firm* — Holzer Patel Drennan

(57) ABSTRACT

Implementations disclosed herein provide a method comprising iteratively reading data from a failing media sector prior to a an error minimization operation, analyzing read data at each iteration using an error minimization operation to determine sections of read data as good data, storing the good data in a buffer during each iteration, and using the good data as input for the read data during a subsequent error retry operation. In another implementation, the method further comprises comparing new read data with stored good data in the buffer, and replacing the stored good data with the new read data if the new read data has a higher quality than the stored good data.

18 Claims, 3 Drawing Sheets

DATA QUALITY PRE-SELECTION IN READ RETRY OPERATIONS

BACKGROUND

Disc drives are data storage devices that store digital data in magnetic form on a rotating storage medium called a disc. Each surface of a disc may be divided into several hundred thousand tracks arranged in tightly-packed concentric circles. Each track is further broken down into sectors that are arranged sequentially. That is, each sector on a track is adjacent to the previous and next sector. Generally, each of the surfaces in a disc drive has a recording head for reading and writing data to a sector with one head per surface of the disc. Data is accessed by moving the heads from the inner to outer part (and vice versa) of the disc drive by an actuator assembly. During a data access operation, one of the heads is positioned over the desired location of a sector on the disc in order to access (i.e., read or write) the sector.

Typically, when a read operation is sent from a host (such as a computer) to the disc drive, a controller converts a logical block address received from the host to a physical block address. Next, the physical track, head and sector information, which include the number of sectors to be read from a destination track, are calculated based on the PBA. A seek operation is then performed and sectors falling on the same track are usually read within a disc revolution. Data read from the disc is transferred to a buffer random access memory (RAM) inside the disc drive before being sent to the host.

SUMMARY

Implementations disclosed herein provide a method comprising iteratively reading data from a failing media sector prior to an error minimization operation, analyzing read data at each iteration to determine sections of read data as good data, storing the good data in a buffer during each iteration, and using the good data as input for the read data during the error minimization operation and a subsequent error retry operation. In another implementation, the method further comprises comparing new read data with stored good data in the buffer, and replacing the stored good data with the new read data if the new read data has a higher quality than the stored good data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTIONS OF THE DRAWINGS

DETAILED DESCRIPTION

Invariably, a disc may contain defective or bad sectors (e.g., manufacturing imperfections may render a sector inoperable). These defective or bad sectors may show up as errors during read operations. Disc read-errors occur when the disc drive is transferring data from the disc to the buffer RAM inside the disc drive. Error correction can be performed on the disc read-errors to correct data that is sent to the host. However, ever increasing disc drive densities increase the number of errors encountered. Some errors occur momentarily due to system noise, thermal conditions or external vibrations. Small magnetic domains have a propensity to reverse their magnetic state due to these conditions. These and other errors may propagate into large errors under certain conditions that ultimately cause long correction times and unrecoverable errors.

The technology disclosed herein includes a method for iteratively reading data from a failing media sector prior to an error minimization operation, analyzing read data at each iteration to determine sections of read data as good data, storing the good data in a buffer during each iteration, and using the good data as input for the read data during the error minimization operation and an error retry operation. In another implementation, the method further comprises comparing new read data with stored good data in the buffer, and replacing the stored good data with the new read data if the new read data has a higher quality than the stored good data.

The disclosed method reduces retries thereby optimizing the read process. It also improves hardware lifespan, reduces noise by reducing the movement of mechanical parts, improves user experience, reduces power consumption, prevents permanent drive degradation, and improves a drive's overall performance.

Figure 1:
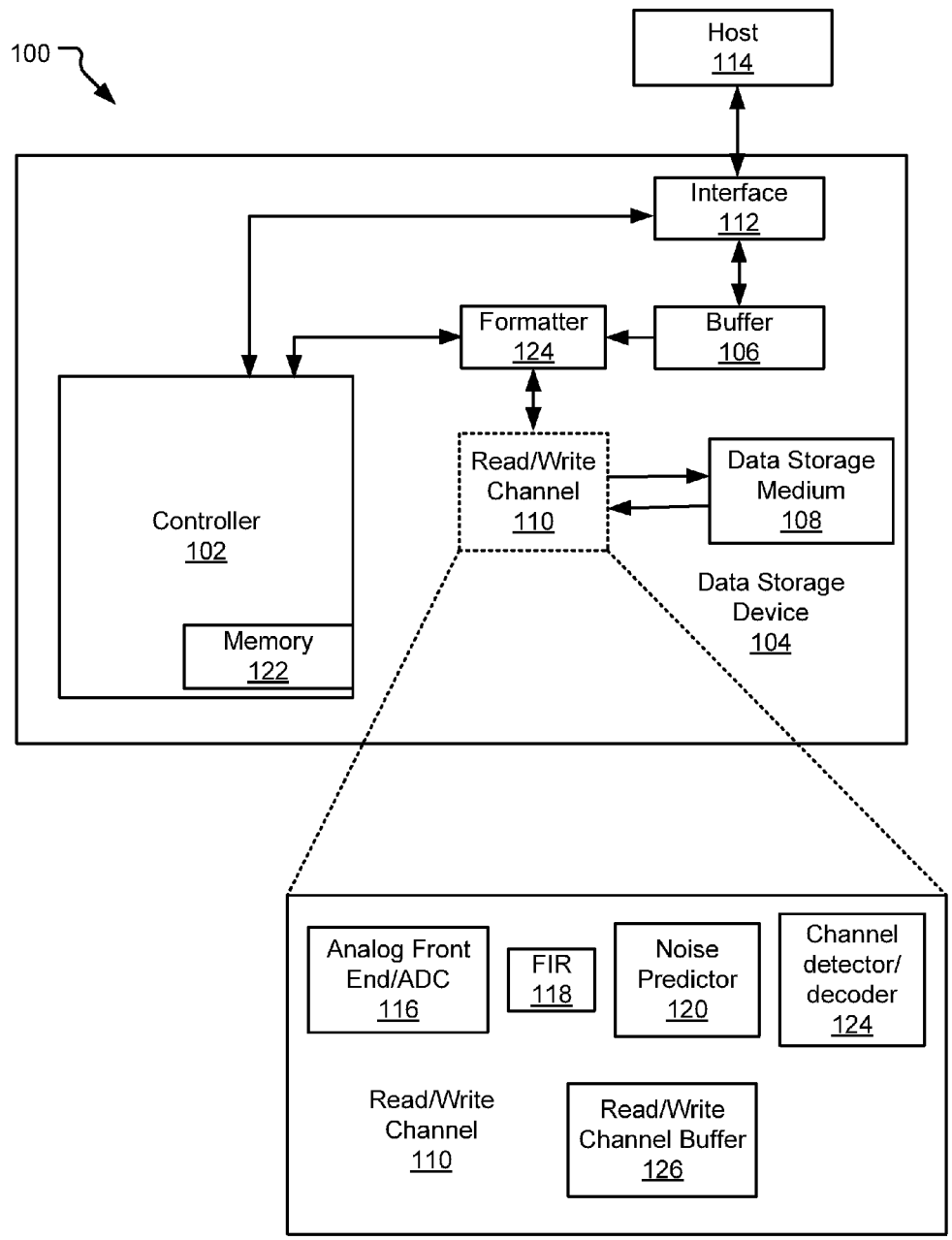
FIG. 1 illustrates a block diagram of an example data storage device system.

FIG. 1 illustrates a diagram of an example data storage device system 100, showing the main functional circuits used on a data storage device 104 (e.g., an SMR HDD, an SMR SSHD, an object storage device, etc.) to control the operation of the data storage device 104. The system 100 includes a host device 114 (e.g., a computer, a mobile device, the internet, etc.) operably connected to the data storage device 104 communicating with each other. The data storage device 104 includes a disc drive controller 102. Control communication paths are provided between a host device 114 and the disc drive controller 102. The disc drive controller 102 provides communication and control for the data storage device 104 in conjunction with programming for the disc drive controller 102 stored in controller memory 122 (e.g., RAM, ROM, etc.). Data is transferred between the host device 114 and the data storage device 104 by way of a disc drive interface 112, a buffer 106, and a formatter 124.

A buffer 106 is used to facilitate high-speed data transfer between the host device 114 and the data storage device 104. Data to be written to a data storage medium 108 (e.g., a disc) is passed from the host device 114 to the interface 112 through the buffer 106, then further through the formatter 124, and then to the read/write channel 110, which encodes and serializes the data and provides the requisite write current signals to the heads (not shown). To retrieve data that has been previously stored by the data storage device 104, read signals are generated by the heads and provided to the read/write channel 110, which performs decoding and outputs the retrieved data through the formatter 124 and buffer 106, to the interface 112 for subsequent transfer to the host device 114.

When read operations fail due to random errors, retry operations occur, which include minimization operations. For example, error detection and correction operations occur during retry operations to minimize errors. Retry operations occur in the read/write channel 110. A read signal is transmitted from the formatter 124 into the read/write channel

110. The signal is transferred through an analog front end/analog to digital converter 116 and to a Finite Impulse Response (FIR) 118. Equalized data samples are collected and error minimization operations (e.g., error removal and error correction operations) occur.

For example, the FIR Sample Average (FSA) and Stochastic Event Recovery Voting (SERV) operations are examples of error removal and correction operations. For example FSA is an example of an error removal operation that removes errors by averaging FSA samples of data obtained through each of multiple reads to improve recovery ability. SERV is an example of an error correction operation that corrects data by determining error information and error location by comparing each data obtained from multiple reads and using a voting process.

The FSA and SERV operations occur by code via the controller 102. The FSA and SERV operations collect equalized data samples (FIR output data) across multiple reads of a failing sector. Then corresponding data samples across the multiple reads are then averaged by firmware. The averaged samples are written back into the read/write channel buffer 126 for a low-density parity-check (LDPC) decode attempt. The more multiple reads, the more noise signal can be reduced by a noise predictor 120. A channel detector and decoder 124 use output data from the FSA and SERV operations. The disclosed technology includes iteratively reading from the same failing disc sector prior to an error minimization operation, storing the good quality data while monitoring data quality for every error recovery retry operation before FSA, SERV, and other operations are performed, and using the stored good quality data as input data.

The read/write channel buffer 126 stores the high quality read data during each iteration. At every read retry, if the data with higher quality compared to the data currently stored in the read/write channel buffer 126 is read, the data with the higher quality is replaced with the data stored in the read/write channel buffer 126, and an algorithm of an operation can be performed with the data stored in the buffer without multiple read operations. The reliability of the data can be increased by giving weight to data according to the quality of the data after determining the quality of the data. As a result, less read data will be used and FSA or SERV operations may not be necessary. The count for reread will be greatly reduced. Read performance and recovery ability is significantly improved because data with a lower error rate is used as read data to perform an algorithm.

Figure 2:
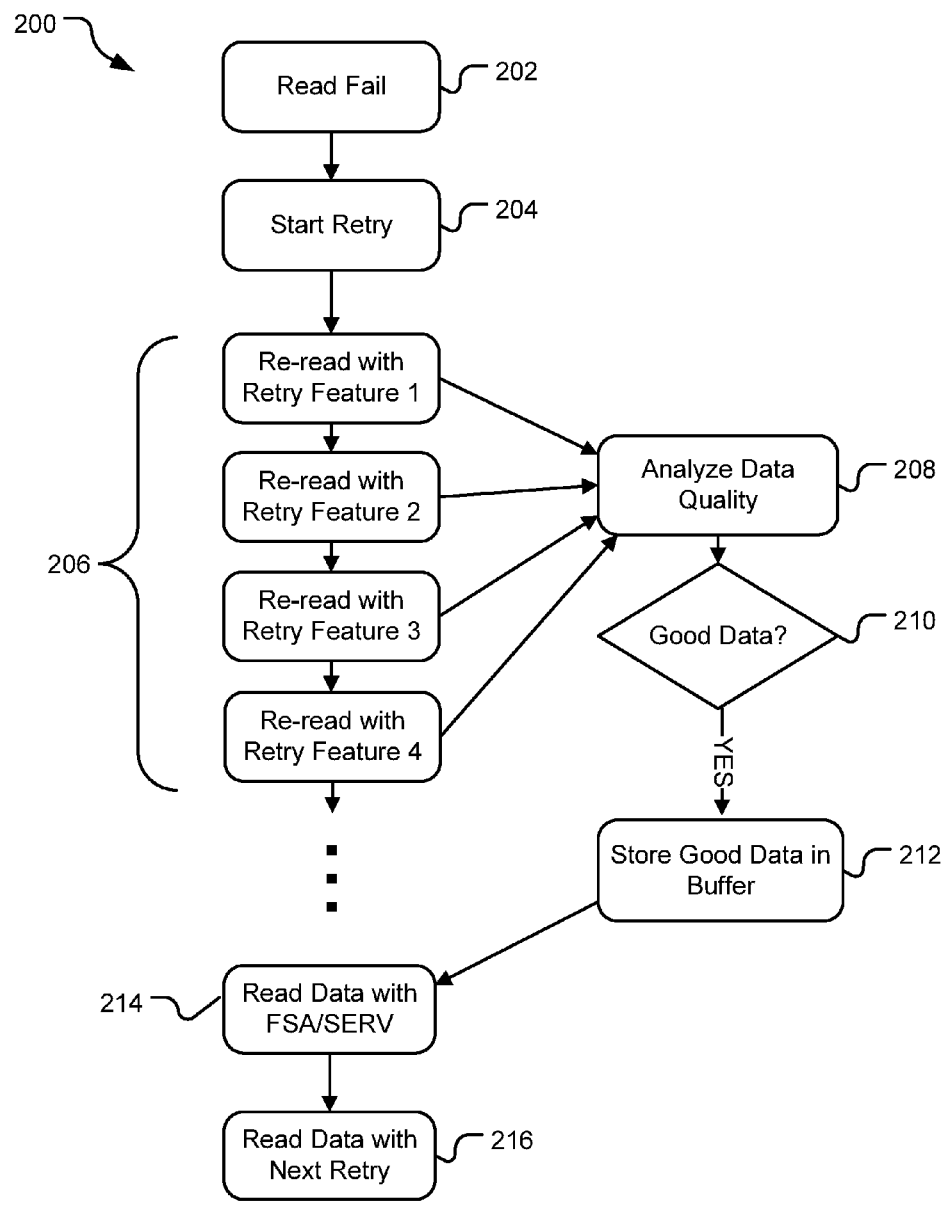
FIG. 2 illustrates a flowchart of example operations for pre-selection of read retry operations.

FIG. 2 is a flowchart of example operations 200 for pre-selection of read retry operations. In a read operation 202, data is read from a media sector and fails. In a start retry operation 204, a retry operations starts a process of re-read operations. The re-read operations 206 include iteratively re-reading from a failing media sector prior to an error minimization operation. The re-read operations 206 can be any number of re-read operations, referenced here, for example, as Retry Features 1, 2, 3, 4 . . . .

Simultaneously, while the re-read operations 206 are occurring, an analyzing operation 208 analyzes the quality of the data re-read in operations 206. For example, bit error rate for a given sector can be analyzed. In one implementation, such analyzing operation 208 may analyze the bit error rate of the read data to determine the quality of the data. For example, a quantitative value may be assigned to the quality of the data.

A determining operation 210 determines whether the quality of the re-read data meets a predetermined criterion for quality data. For example, such a predetermined criterion may be the bit error rate of the section of the data being higher than a predetermined bit error rate. A comparison register of a microprocessor may be used to compare the quality of the re-read data with the value of the threshold. If the read data is good data, as indicated by the quality of the read data being higher or equal to the value of the threshold, then a storing operation 212 stores the good data in a buffer. However, if the read data is not good data, in that the quality of the read data does not meet the predetermined criterion, no action is taken.

Once the good data is stored in the buffer, if the retry operation meets the SERV/FSA order during retry operations 206, a reading operation 214 reads the good data from the buffer with retry error minimization operations, such as FSA and SERV operations. FSA and SERV operations collect equalized data samples (FIR output data) across multiple reads of a failing sector to recover the error signal or data. Then corresponding data samples across the multiple reads are then averaged by firmware.

One efficient way for improving recovery performance is to use a weighted value as an input value for the retry operations. The retry operations average multiple data to reduce the irregular error. Good data has little noise whereas bad data has a lot of noise. In most implementations, noise power is lower than data power. The averaged samples are written back into the read/write channel buffer for a LDPC decode attempt. By using the weighted average for the operations, the output of these operations has lower noise than normal average value. In a reading operation 216, data is read with the next retry operation.

Figure 3:
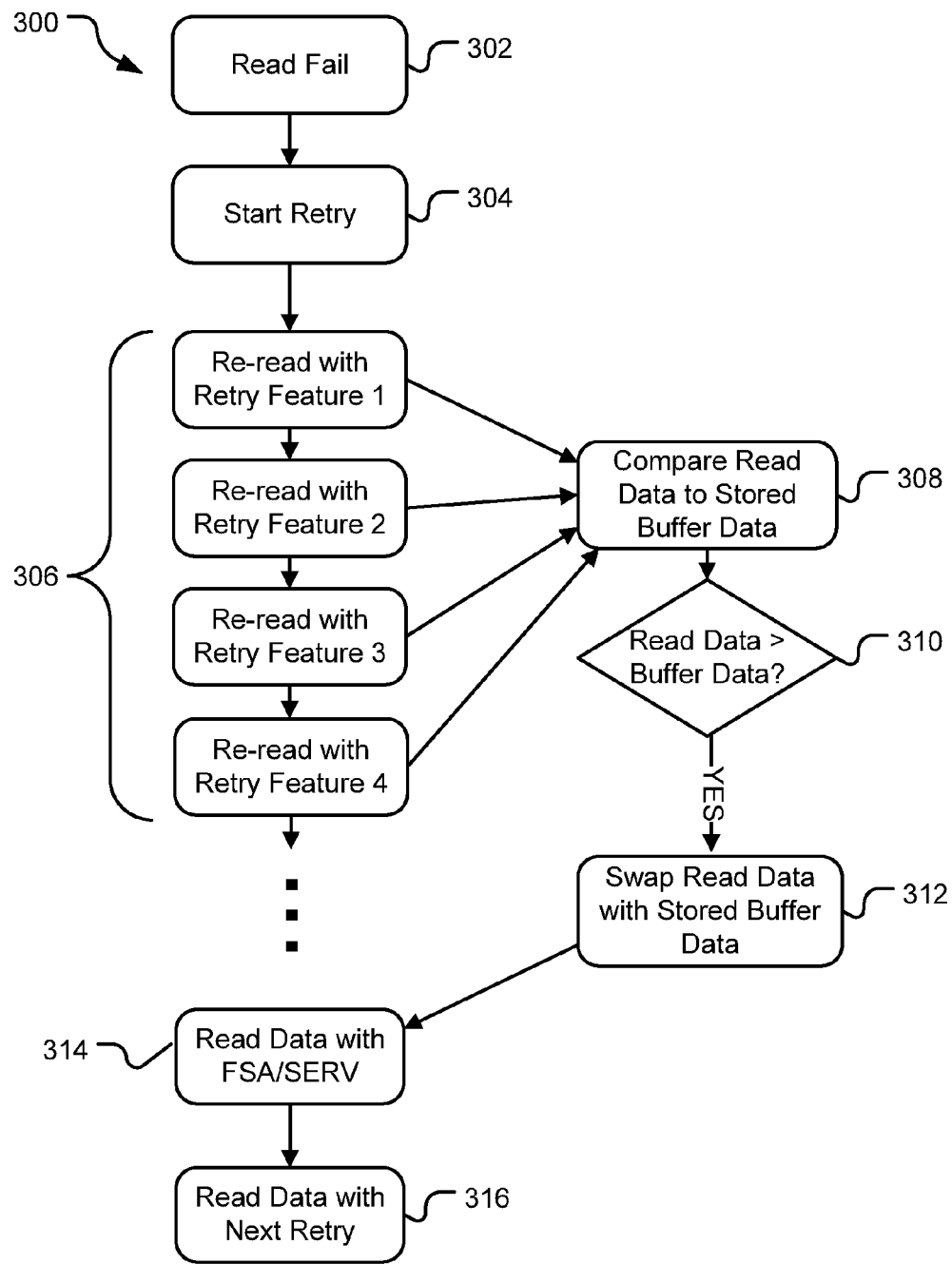
FIG. 3 illustrates a second flowchart of example operations for pre-selection of read retry operations.

FIG. 3 illustrates a second flowchart of example operations 300 for pre-selection of read retry operations. In a read operation 302, data is read from a media sector and fails. In a start retry operation 304, a retry operations starts a process of re-read operations. The re-read operations 306 include iteratively re-reading from a failing media sector prior to an error minimization operation. The re-read operations 306 can be any number of re-read operations, referenced here, for example, as Retry Features 1, 2, 3, 4 . . . .

While the re-read operations 306 are occurring, at the same time, a comparing operation 308 compares read data to high quality data previously stored in the buffer. If the read data is of greater quality than the high quality data stored in the buffer, then a swapping or replacing operation 312 replaces the high quality data stored in the buffer with the read data.

Once the good data is stored in the buffer, a reading operation 314 reads the good data from the buffer with retry error minimization operations, such as FSA and SERV operations. The FSA and SERV operations can reduce noise signal using average data signal. The error recovery power can be changed according to how many data is used to input data to average the data. The count of the input data can vary. The FSA and SERV operations collect equalized data samples (FIR output data) across multiple reads of the failing sector. Then corresponding data samples across the multiple reads are then averaged by firmware. In a reading operation 316, data is read with the next retry operation. If a data error is corrected at any retry step, the retry operation stops. The disclosed methods reduce retries, optimize the read process, and improve a drive's overall performance.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems.

Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
    iteratively reading data from a failing media sector prior to an error minimization operation;
    analyzing read data at each iteration to determine sections of read data as good data if the quality of the read data meets a predetermined criterion;
    storing the good data in a buffer during each iteration;
    comparing new read data with stored good data in the buffer;
    replacing the stored good data with the new read data if the new read data has a higher bit error rate than the bit error rate of the stored good data; and
    using the new read data as input for the read data during the error minimization operation and a subsequent error retry operation.

2. The method of claim 1, wherein the error minimization operation is an error removal operation.

3. The method of claim 2, wherein the error removal operation is a FIR Sample Average operation.

4. The method of claim 1, wherein the error minimization operation is an error correction operation.

5. The method of claim 4, wherein the error correction operation is a Stochastic Event Recovery Voting operation.

6. The method of claim 1, further comprising:
    using the stored good data as input for the read data during the error minimization operation and a subsequent error retry operation if the stored good data has a higher bit error rate than the bit error rate of the new read data.

7. An apparatus, comprising:
    a host configured to send a read request to a storage device; and
    the storage device configured to:
        iteratively read data from a failing media sector prior to an error minimization operation;
        analyze read data at each iteration to determine sections of read data as good data, store the good data in a buffer during each iteration;
        compare new read data with stored good data in the buffer;
        replace the stored good data with the new read data if the new read data has a higher bit error rate than the bit error rate of the stored good data; and
        use the new read data as input for the read data during the error minimization operation and a subsequent error retry operation.

8. The apparatus of claim 7, wherein the storage device is further configured to perform an error removal operation before performing read retry operations.

9. The apparatus of claim 8, wherein the error removal operation is a FIR Sample Average operation.

10. The apparatus of claim 7, wherein the storage device is further configured to perform an error correction operation before performing read retry operations.

11. The apparatus of claim 10, wherein the error correction operation is a Stochastic Event Recovery Voting operation.

12. The apparatus of claim 7, wherein the storage device is further configured to:
    use the stored good data as input for the read data during the error minimization operation and a subsequent error retry operation if the stored good data has a higher bit error rate than the bit error rate of the new read data.

13. A non-transitory computer-readable storage medium encoding computer-executable instructions for executing on a computer system a computer process that compares high-latency data sectors of a storage band, the computer process comprising:
    iteratively reading data from a failing media sector prior to an error minimization operation;
    analyzing read data at each iteration to determine sections of read data as good data if the quality of the read data meets a predetermined criterion;
    storing the good data in a buffer during each iteration;
    iteratively comparing new read data with stored good data in the buffer;
    replacing the stored good data with the new read data if the new read data has a higher bit error rate than the bit error rate of the stored good data; and
    using the new read data as input for the read data during the error minimization operation and a subsequent error retry operation.

14. The non-transitory computer-readable storage medium of claim 13, wherein the the error minimization operation is an error removal operation.

15. The non-transitory computer-readable storage medium of claim 14, wherein the error removal operation is a FIR Sample Average operation.

16. The non-transitory computer-readable storage medium of claim 13, wherein the error minimization operation is an error correction operation.

17. The non-transitory computer-readable storage medium of claim 16, wherein the error correction operation is a Stochastic Event Recovery Voting operation.

18. The non-transitory computer-readable storage medium of claim 13, further comprising:
   using the stored good data as input for the read data during the error minimization operation and a subsequent error retry operation if the stored good data has a higher bit error rate than the bit error rate of the new read data.

* * * * *